United States Patent [19]

Imamichi

[11] Patent Number: 4,511,794

[45] Date of Patent: Apr. 16, 1985

[54] SYSTEM FOR PERFORMING TRANSACTIONS

[75] Inventor: Tutomu Imamichi, Kurita, Japan

[73] Assignee: Omron Tateisi Electronics Co., Kyoto, Japan

[21] Appl. No.: 442,417

[22] Filed: Nov. 17, 1982

[30] Foreign Application Priority Data

Nov. 18, 1981 [JP] Japan ................................ 56-185904
Nov. 18, 1981 [JP] Japan ................................ 56-185905
Nov. 19, 1981 [JP] Japan ................................ 56-186733

[51] Int. Cl.[3] ............................................ G06F 15/30
[52] U.S. Cl. .................................... 235/379; 209/534
[58] Field of Search ........................ 340/379; 209/534

[56] References Cited

U.S. PATENT DOCUMENTS 4,225,779 9/1980 Sano et al. .......................... 235/379

FOREIGN PATENT DOCUMENTS 24704 3/1981 European Pat. Off. .

*Primary Examiner*—David L. Trafton

*Attorney, Agent, or Firm*—Cushman, Darby & Cushman

[57] ABSTRACT

A transaction performing system comprising a cash handling device of the circulation type having cash containers for accommodating received cash as classified according to the kind of money and delivering cash from the containers for dispensing, and sensors for detecting the condition of cash in each container. According to the condition of cash detected, the state of transaction is controlled. The control of the state of transaction includes change of the mode of transaction, limitation of receiving cash and limitation of delivery of cash. The mode of transaction includes a cash receiving-delivery mode, a cash receiving-only mode, and a cash delivery-only mode. The change of the transaction mode is so controlled that when the amount of cash in the container has increased greatly to the full, the receiving-delivery mode is changed to the delivery-only mode, whereas when the amount has decreased to a very small quantity (very scanty), the receiving-delivery mode is changed to the receiving-only mode. The delivery and receipt of cash are also controlled according to the condition of cash in the container.

22 Claims, 17 Drawing Figures

SYSTEM FOR PERFORMING TRANSACTIONS

BACKGROUND OF THE INVENTION

The present invention relates to a system for performing transactions which is useful in banking business and like financial business for executing deposit and payment transactions, and more particularly to such a transaction performing system which has a cash handling device of the circulation type for accommodating the cash received for deposits in cash containers as classified according to the kind of money and for delivering cash from the containers for payment transactions.

Conventional transaction performing systems having a cash handling device of the circulation type are unable to execute transactions continually and are therefore brought out of operation when at least one container has been filled with cash or become nearly empty. In such an event, the clerk collects the cash or replenishes the container with cash, and the operation of the system is thereafter resumed. Without such intervention by the clerk, the system fails to operate smoothly, hence inconvenient, while the system is not fully serviceable for customers because of an interruption of the operation.

SUMMARY OF THE INVENTION

An object of the present invention is to provide a transaction performing system equipped with a cash handling device of the circulation type which system is adapted for a continued operation irrespective of the condition of cash accommodated in its cash containers to offer improved services to customers.

The present invention provides a system for performing transactions which comprises a cash handling device of the circulation type having cash containers for accommodating received cash as classified according to the kind of money and delivering cash from the containers for dispensing, means for detecting the condition of cash in each of the containers, and means for controlling the state of transaction according to the condition of cash detected.

The control of the state of transaction includes change of the mode of transaction, limitation of receiving cash and limitation of delivery of cash. The mode of transaction includes a cash receiving-delivery mode, a cash receiving-only mode, and a cash delivery-only mode. The change of the transaction mode is so controlled that when the amount of cash in the container has increased greatly to the full, the receiving-delivery mode is changed to the delivery-only mode, whereas when the amount has decreased to a very small quantity (very scanty), the receiving-delivery mode is changed to the receiving-only mode. Accordingly even if the container is full, the cash handling device at least permits payment transactions, while even if the remaining cash is scanty, depositing transactions can be carried out, consequently eliminating the likelihood that the system, if entirely brought out of operation for transaction, will be unable to serve customers. Because the system is in continued operation for payment transactions when set in the delivery-only mode due to the cash filling the container, the amount of cash accommodated gradually decreases to eventually set the system in the receiving-delivery mode. Conversely the system continues to operate for depositing transactions, when set in the receiving-only mode because the cash in the container has decreased to a very scanty amount. This progressively increases the amount of cash accommodated to eventually change the mode to the receiving-delivery mode. Thus even if the system temporarily becomes unable to receive or deliver cash, the system returns to the normal state without the intervention by the clerk, continuously operating for performing transactions.

According to the invention, the delivery of cash and the receipt of cash can also be limited. When the amount of bills in the container of the cash handling device of the circulation type has reduced to a very scanty condition, a limitation is imposed on the delivery of cash, such as change of kind of money, limitation of the kind of money or suspension of payment, in accordance with the condition of the accommodated bills so as to permit the system to operate continuously at least for deposit transactions. Further when the amount of bills in the container has increased to the full, a limitation is imposed on the receipt of cash, such as limitation of the kind of money and suspension of depositing service, to assure a continued operation at least for payment transactions. Accordingly the situation is avoidable in which the system is totally held out of transaction services, failing to serve customers. When the amount of bills in the container is subsequently increased or decreased by cash receiving or dispensing transactions, the limitation of cash delivery or receiving is cancelled to permit both deposit and payment transactions. Thus even if the system temporarily becomes unable to receive or deliver cash, the system returns to the normal state without the intervention by the clerk, continuously operation for performing transactions.

Other features and detailed construction of the system of the invention will become more apparent from the following description of embodiments with reference to the accompanying drawings.

DESCRIPTION OF THE PREFERRED EMBODIMENTS

Figure 1:
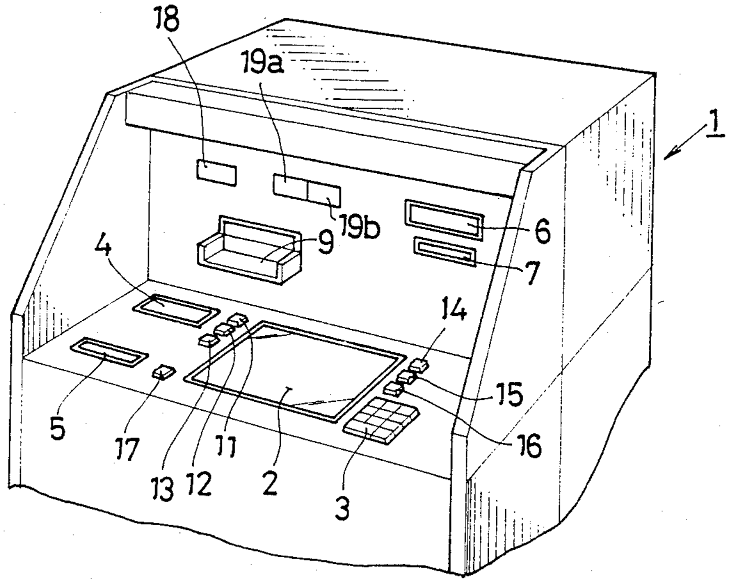
FIG. 1 is a perspective view showing the appearance of an example of terminal unit.

FIG. 1 shows the appearance of a terminal unit, which is adapted to perform payment, depositing and other transactions. The terminal unit 1 has a forwardly projecting horizontal control panel which is provided with a cathode-ray tube (hereinafter referred to as "CRT") 2 for showing manipulation instructions for the customer, the functions of function buttons 11 to 17, the sum to be paid and other input data, and other information to be given to the customer. Arranged on opposite sides of the CRT 2 adjacent thereto are the functional buttons 11 to 13, 17 and 14 to 16 in vertical rows. These functional buttons 11 to 17 are used for the selection, cancellation and confirmation of the kind of transaction, the unit of amount of money, etc. to enter the inputs therefor. A ten-key arrangement 3 is arranged at the right front corner of the panel for keying in the secret number identifying a customer, the sum to be paid, etc. The panel further has a bill inlet 4 for inserting bills in depositing transactions, and a bill outlet 5 for discharging bills for payment transactions and also for returning bills when the bills are inserted for a depositing transaction but a cancelling input is thereafter given.

The terminal unit 1 has a vertical control panel which is formed at the right side thereof with a a card inlet 6 for a magnetic card having magnetically recorded therein the personal code (such as secret number, account number, etc.) of a customer eligible for banking transactions, and also with an outlet 7 for discharging a receipt having transaction data printed thereon and issued when a transaction is performed without using a bank book. A bank book inlet 9 is formed in the panel at a left portion thereof. Provided above the bank book inlet 9 are an operation indicator 18 for showing that the terminal unit 1 is in condition for transactions, and a transaction mode indicator comprising two pilot lamps 19*a*, 19*b* for showing the kinds of transaction that can be executed. The operation modes of the terminal unit 1 are a receiving-only mode in which depositing transactions only are performed, a delivery-only mode for carrying out payment transactions only, and a receiving-delivery mode in which both depositing and payment transactions can be performed. The pilot lamp 19*a* only is on when the unit is in receiving-only mode, the pilot lamp 19*b* only is on when it is in delivery-only mode, and both the lamps 19*a*, 19*b* are on for receiving-delivery mode.

Figure 2:
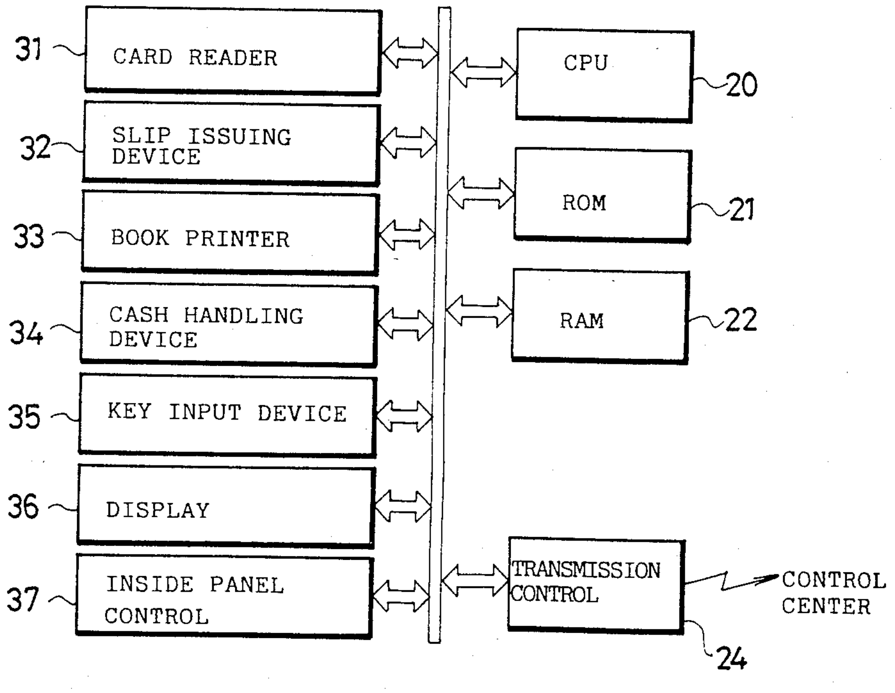
FIG. 2 is a block diagram showing the construction of the terminal unit.

FIG. 2 shows the interior construction of the terminal unit, which is controlled by a CPU 20. The CPU 20 has a card reader 31 provided inside the card inlet 6 for reading the data recorded in the magnetic card, a slip issuing device 32 for recording the kind of transaction, sum of payment or deposit and other transaction data for the bank and issuing a slip or receipt to the customer for every transaction, a bank book printer 33 for printing such data on the bank book, a cash handling device 34 of the circulation type for receiving bills upon checking for depositing transactions and for delivering bills in the sum of payment for payment transactions, a key input device 35 including the function buttons 11 to 17 and the ten-key arrangement 3, display means 36 including the CRT 2, operation indicator 18 and transaction mode indicators 19*a*, 19*b*, and a control 37 on an unillustrated inside panel for monitoring and operating the terminal unit. A master CPU may be used as the CPU 20, with a slave CPU provided for controlling each of the input and output devices 31 to 37, so as to control the terminal 1 with a master slave system. The CPU 20 has a ROM 21 having its program stored therein and a RAM 22 for storing the transaction data and other data. The CPU 20 conducts communications with the control center through a transmission control 24 to execute various transactions under the instructions from the center.

Figure 3:
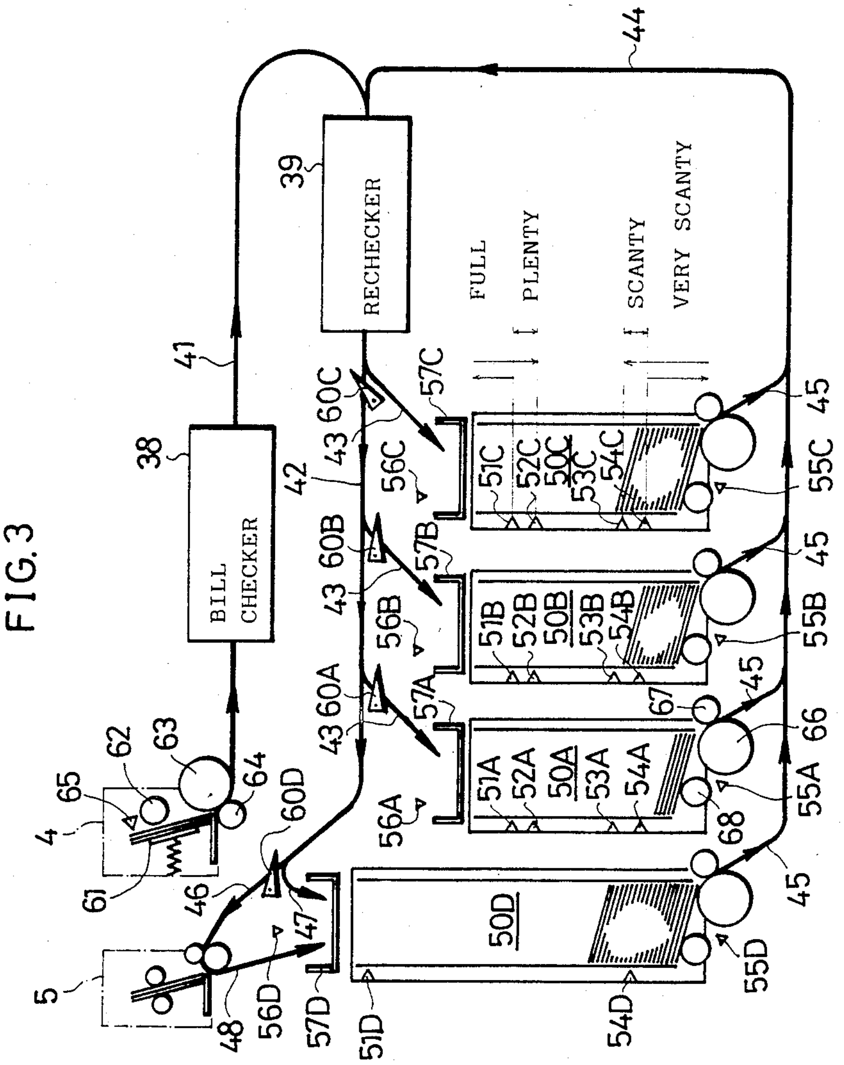
FIG. 3 schematically shows the construction of a cash handling device of the circulation type.

FIG. 3 shows the construction of the cash handling device 34 of the circulation type. The present embodiment uses three kinds of bills, e.g., $1, $5 and $10 bills, which will be indicated at A, B and C respectively. The device 34 has bill containers 50A, 50B and 50C for accommodating bills as classified according to the kind of bill and a combined bill container 50D. The bill containers 50A to 50C are fixed in position for storing bills A to C, respectively. The bill container 50D accommodates bills together irrespective of the kind of bill and is removable for replenishment and collection of cash. For the accommodation of bills, the container 50D has about 3 times the capacity of the containers 50A to 50C. Unless otherwise mentioned, the containers 50A to 50D, sensors provided within these containers, bill retainers associated with the containers and switching flappers will be referred to collectively without using the adscript characters A to D in the following description.

Each retainer 50 is provided thereabove with a bill retainer 57 having unillustrated means by which the bills temporarily held in the retainer are sent into the container 50 below. The retainer 57 further has a sensor 56 for detecting the absence or present of bills temporarily held therein. The container 50 has in its interior a full sensor 51, a plenty sensor 52, a scanty sensor 53, a very scanty sensor 54 and an empty sensor 55 as arranged in this order downward. These sensors, the sensor 56 for the retainer 57 and the sensor 65, to be described below, for the inlet 4 are all photoelectric sensors. When bills are detected by the sensor 51, the container concerned is interpreted as being full of bills. When bills are detected by the sensor 52 with no bills detected by the sensor 51, it is interpreted as containing a plenty of bills. The container is interpreted as containing a scanty amount of bills when bills are detected by the sensor 54 with no bill detected by the sensor 53. Bills are very scanty when no bill is detected by the sensor 54 (with bills detected by the sensor 55). Even if the container is full, it has sufficient room for accommodating the bills to be received for at least one depositing transaction. Similarly even if very scanty, the amount of bills remaining in the container 50 is not smaller than the amount to be dispensed for at least one payment transaction. The combined container 50D is provided with a full sensor 51D, a very scanty sensor 54D and an empty sensor 55D.

Each container 50 has at its bottom a bill delivering means, which comprises an eccentric roller 68 for separating off the lowermost bill of a stack of bills, a dispenser roller 66 and a friction roller 67 in pressing contact therewith. The bills in the container 50 are delivered therefrom one by one.

The bill inlet 4 is also provided with bill delivering means comprising an eccentric roller 62, a dispenser roller 63 and a friction roller 64. When bills are inserted into the inlet 4, a bill holding plate 61 provided inside the inlet 4 advances to hold the bills between the plate 61 and the eccentric roller 62, and the bills are thereafter sent forward one by one. The bills are sent into a separating path 42 by way of an inlet path 41. The path 41 is provided at an intermediate portion with a bill checker 38 for checking the bills for kind and genuineness.

Three storing paths 43 branching off from the separating path 42 extend toward the retainers 57 for the containers 50. At the locations of the separating path 42 where the storing paths 43 are branched, switch flappers 60A to 60C are provided individually, which are controlled by the checking results of the checker 38 which identifies the kind of bills. For example, when bills are detected as the kind C by the device 38, the corresponding flapper 60C is moved to block the separating path 42 to send the bills to the retainer 57C. The bills temporarily held in the retainer 57 are placed into the container 50 upon the completion of the transaction concerned or the transaction for the next customer is to be initiated.

The separating path 42 extends toward the bill outlet 5 into an outlet path 46, at an intermediate portion of which a storing path 47 is branched off. The path 47 extends into the retainer 57D. A switch flapper 60D is provided also at the branched portion. A return path 48 extends from the outlet 5 to the retainer 57D. The bill or bills included in the bills received and found to be not genuine by the checker 38 are sent by way of the separating path 42 to the outlet path 46, from which the bills are sent to the outlet 5.

A delivery path 45 extends from the delivery means for each container 50 and is connected to a transport path 44, which is further connected to the separating path 42. In the vicinity of the junction, a bill rechecker 39 is disposed. In payment transactions, the bills corresponding to the sum of payment are dispensed from the containers 50A to 50C one by one and sent via the delivery paths 45 and transport path 44 to the rechecker 39, in which the bills are rechecked for kind and genuineness. The bills are then sent to the outlet 5 via the separating path 42 and the outlet path 46. As the result of the checking by the rechecker 39, some bills may be found not to be genuine or out of match with the kind specified. In such an event, the bills are sent through the separating path 42 and storing path 47 to the retainer 57D and thereafter placed into the container 50D. If the payment transaction is cancelled after the bills to be delivered have been transferred to the outlet 5, the bills in the outlet 5 are collected in the retainer 57D via the return path 48. When the depositing transaction is cancelled after the bills received have been held in the retainer 57A, an amount of bills corresponding to the sum received are dispensed from the containers 50A to 50C and forwarded to the outlet 5 and returned.

The inlet path 41, separating path 42, storing paths 43, transport path 44, delivery paths 45, outlet path 46, storing path 47 and return path 48 comprise rollers arranged at suitable locations and belts reeved around the rollers. Although not shown, double transport sensors for detecting that at least two superposed bills have been forwarded, and abnormal length sensors for checking the bills forwarded or dispensed for length are disposed in the vicinity of the bill dispensing outlets of the inlet 4 and of the containers 50. Arranged at suitable locations in the paths 41 to 48 are bill passage sensors for checking a bill jam based on the time taken for the bill to travel from one passage sensor to another passage sensor which are spaced apart by a distance.

Figure 4:
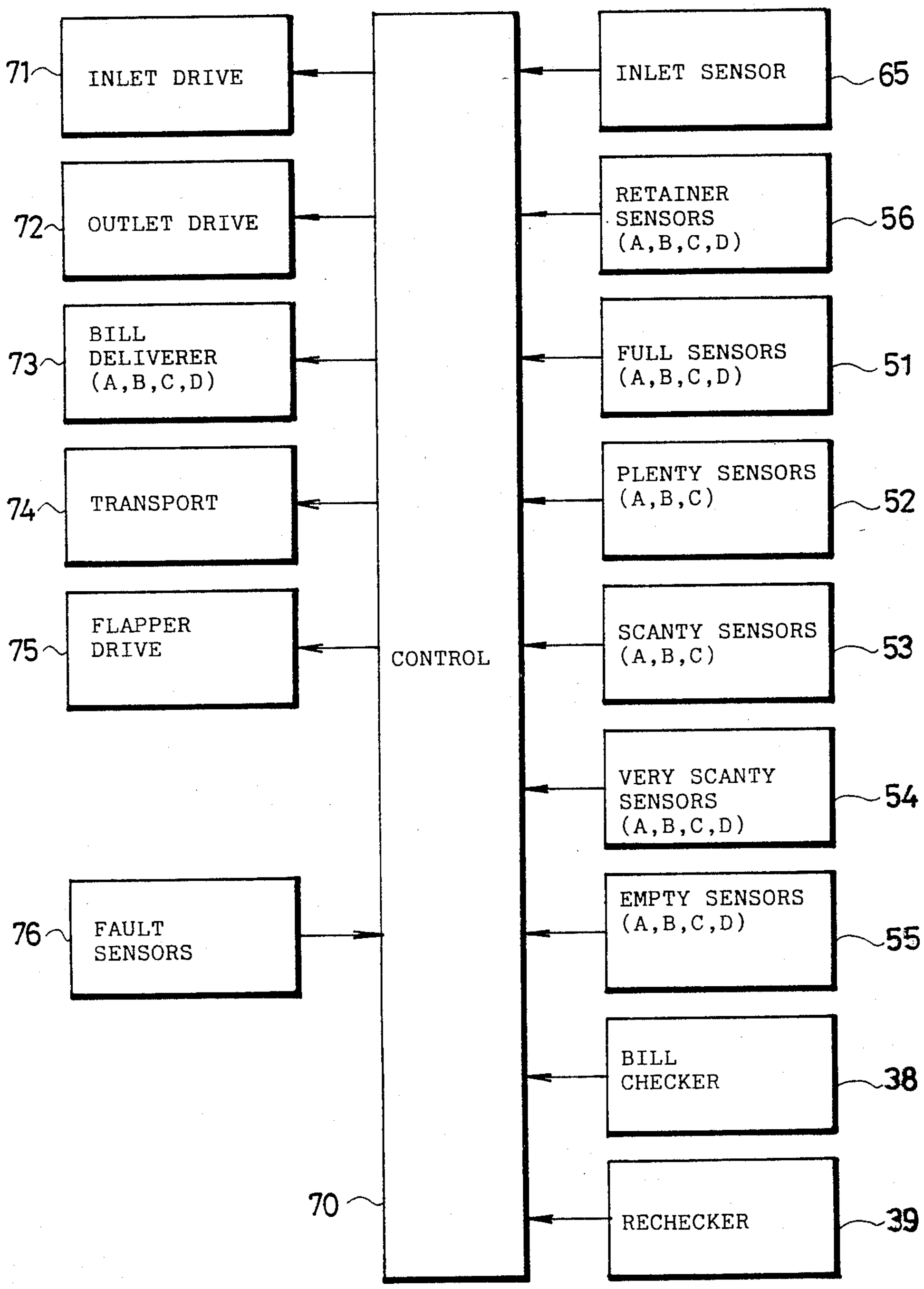
FIG. 4 is a block diagram showing the electric construction of the device.

FIG. 4 shows the electrical construction of the cash handling device 34. Preferably a control 70 comprises a CPU, a ROM having a program stored therein and a RAM for storing various items of data. Detecting or checking signals are fed to the control 70 from fault sensors 76, such as the sensors 65, 51 to 56, bill checker 38, rechecker 39 and double sensors. In response to these input signals and to instructions from the CPU 20 and in accordance with predetermined procedures, the control 70 controls inlet drive means 71 including the bill delivering means and shutter for the inlet 4, outlet drive means 72 including pinch rollers and shutter for the outlet 5, bill delivery means 73 for the containers 50, drive means 74 for the transfer paths 41 to 48, and drive means 75 for the switch flappers 60.

Figure 5:
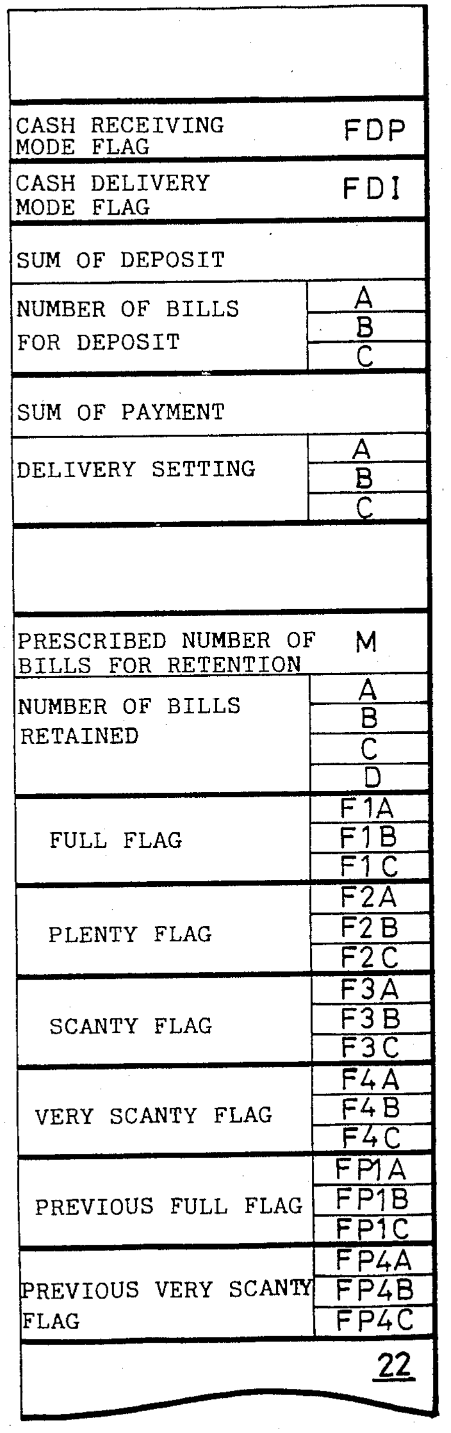
FIG. 5 shows part of the contents of a RAM in the terminal unit.

FIG. 5 shows part of the contents of the RAM 22 included in the terminal 1. The RAM 22 includes areas for use as a receiving mode flag FDP and a delivery mode flag FDI, an area for storing the sum of a deposit, an area for storing the number of each kind of bills received for the deposit, an area for storing the sum to be paid and keyed-in, an area for setting the number of bills of each kind to be delivered for payment as requested, an area for storing the maximum number of bills, M, to be temporarily held in the retainer 57 for each container 50, an area for storing the number of bills held in each retainer 57, areas for use as flags F1A to F4C for storing the current conditions of the containers 50A to 50C as to whether bills are placed in to the full and in plenty, scanty and very scanty amounts, and areas for use as flags FP1A to FP1C and FP4A to FP4C for storing the previous full and very scanty conditions of the containers 50A to 50C. The flag FDP only changes to 1 for the receiving-only mode, FDI only to 1 for the delivery-only mode, and both FDP and FDI to 1 for the receiving-delivery mode. The flags F1A to F4C are set to 1 when the cash in the containers 50A to 50C is currently in the full, plenty, scanty and very scanty conditions, respectively. The flags FP1A to FP1C and FP4A to FP4C are set to 1 when the cash was previously in the full and very scanty conditions, respectively.

Figure 6:
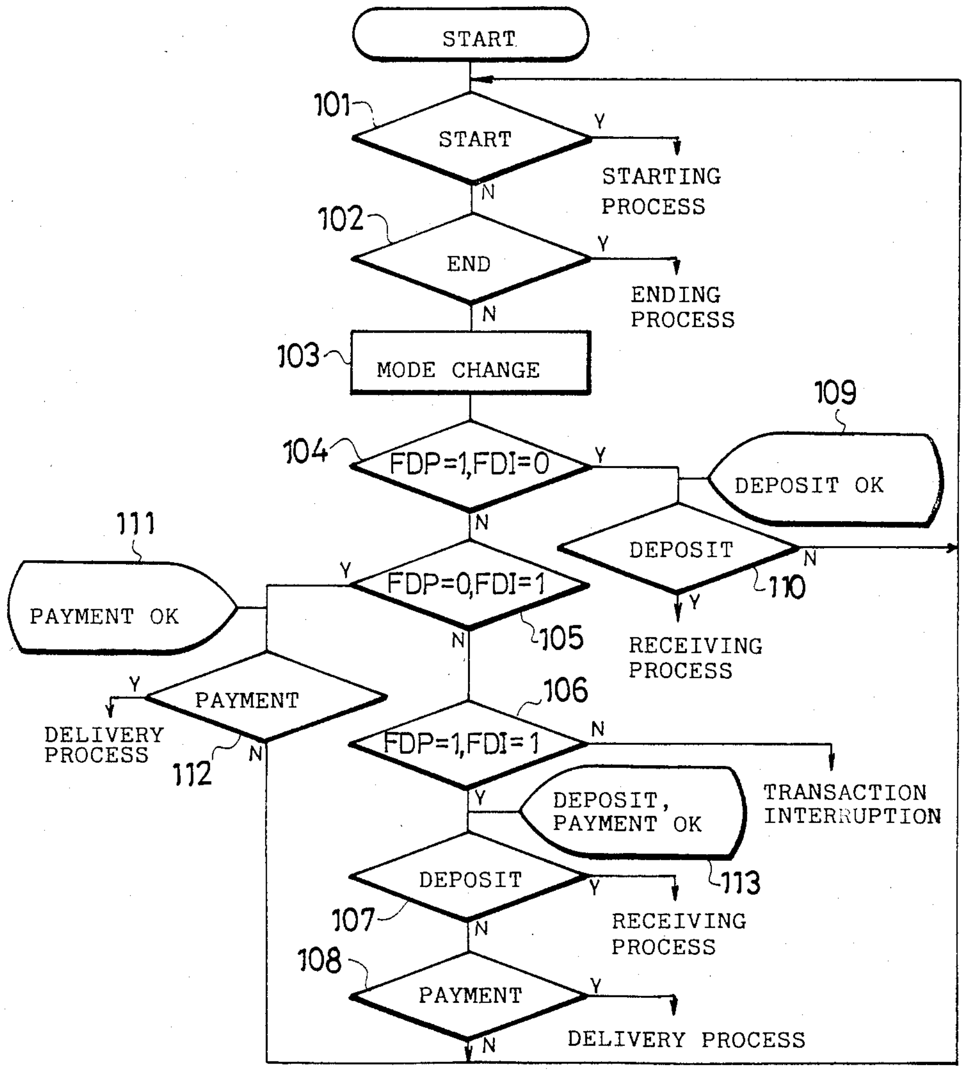
FIG. 6 is a flow chart showing the overall operation of the terminal unit.

FIG. 6 shows the overall operation of the terminal unit 1, which has a service start switch and service ending switch on the inside panel. When these switches are turned on (steps 101, 102), the start and ending processes to be described later will be executed. On completion of these processes, the sequence returns to "start" again. If there is no need for the start or ending process, a mode change process is executed (step 103) as will be described later. After the mode change process, the mode flags FDP and FDI are checked (steps 104 to 106). If the flag FDP is 1, with FDI=0 (step 104), the unit is in receiving-only mode (step 104), so that the pilot lamp 19*a* only is turned on, indicating that the unit is in condition for depositing transactions but not for payment (step 109). With reference to manipulation instructions on the CRT 2, the customer selects depositing with one of the function buttons 11 to 16 (step 110) for depositing. Even if payment is selected by one of the buttons 11 to 16, the selection input is null, and the sequence returns to "start". When FDP is 0 and FDI is 1 (step 105), the unit is in the delivery-only mode. Accordingly the lamp 19*b* only goes on, indicating that the unit is in condition for payments but not for deposits (step 111). When the customer selects payment (step 112), a payment transaction is performed, whereas if depositing is selected, the sequence returns to "start"

since this input is null. If the flags FDP and FDI are both 1 (step 106), the unit is in the receiving-delivery mode. Both pilot lamps 19*a*, 19*b* are turned on, indicating that the unit is in condition for depositing and payment transactions (step 113). In accordance with the kind of transaction selected by the customer, a deposit or payment transaction is processed (step 107, 108). If both flags FDP and FDI are 0, the transaction service is suspended.

The steps to be performed for starting and ending the service operation of the terminal unit 1 include charging and collection of bills. For starting, the combined container 50D filled with bills of the kinds A, B and C is set in position. On closing the service start switch, the bills in the container 50D are transferred into the containers 50A to 50C as classified according to the kind of bill. When the ending switch is turned on for ending the service, the bills in the containers 50A to 50C are transferred to the combined container 50D, whereupon the clerk removes the container 50D to collect the bills.

Figure 7:
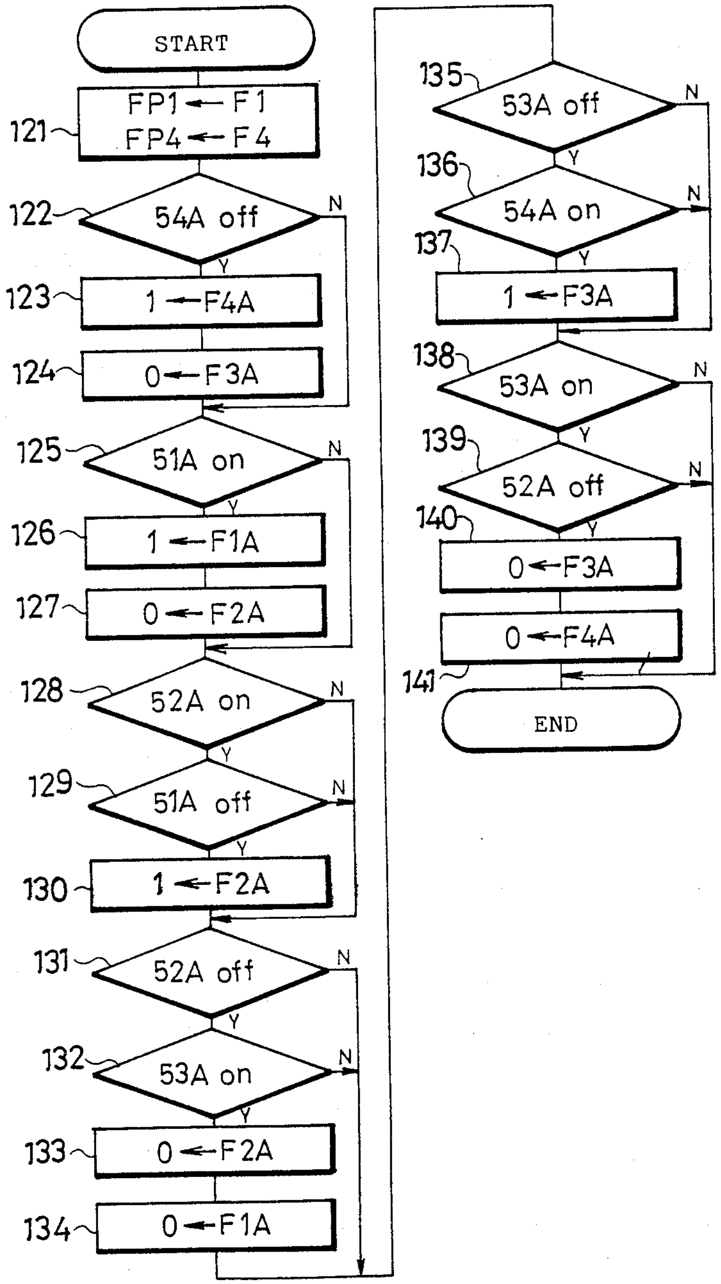
FIG. 7 is a flow chart showing a sensor reading process.

FIG. 7 shows a procedure for reading the sensors of the container included in the mode change process (step 103). Although the flow chart, except for step 121, shows only the processing for the sensors on the container 50A, the same procedure is followed also for the sensors on the other containers 50B and 50C. First, the current states of the full flags F1A to F1C and the very scanty flags F4A to F4C are stored in the RAM 22 as the previous full flags FP1A to FP1C and the previous very scanty flags FP4A to FP4C (step 121). Next, the output signal of the very scanty sensor 54A is read (step 122). If it is off (not detecting any bill), the very scanty flag F4A is set to 1, with the scanty flag F3A reset to 0 (steps 123 and 124). Nothing is done if the sensor 54A is on (detecting bills). Subsequently the full sensor 51A is checked (step 125). If it is on, the full flag F1A is set to 1, and the plenty flag F2A is reset to 0 (steps 126, 127). When the plenty sensor 52A is on with the full sensor 51A off (steps 128, 129), the uppermost bill is positioned between the two sensors 52A and 51A, and the bills are in the plenty condition, so that the plenty flag F2A is set to 1 (step 130). With a decrease in the amount of bills in the container 50A, the sensor 52A becomes off (step 131). If the sensor 53A is on (step 132), the bills in the container are no longer in the plenty condition, so that the flag F2A is reset to 0 (step 133). At this time, the full flag F1A is also reset to 0 (step 134). If the sensor 53A is off (step 135), with the sensor 54A on (step 136), the condition is scanty. The scanty flag F3A is therefore set to 1 (step 137). With an increase of the amount of bills from the scanty condition, the sensor 53A is turned on (step 138). If the sensor 52A is off (step 139), the condition is no longer "scanty", so that the flag F3A is reset to 0 (step 140). At this time, the scanty flag F4A is also reset to 0 (step 141). The process shown in FIG. 7 may be executed by a slave CPU for the cash handling device 34.

According to the present embodiment, the transaction performing system, when in the receiving-delivery mode, is changed over to the delivery-only mode upon one of the classifying containers 50A to 50C reaching the full condition. Further the mode is changed to the receiving-only mode when one of the containers 50A to 50C has reached the very scanty condition. As bills are dispensed from the containers 50A to 50C for payment transactions executed in the delivery-only mode, the cash in the containers decreases. When all the containers are no longer full, the delivery-only mode is changed to the receiving-delivery mode. As bills are accommodated in the containers 50A to 50C for deposit transactions performed in the receiving-only mode, the cash in containers increases. When all the containers 50A to 50C are no longer in the very scanty condition, the system is changed over from the receiving-only mode to the receiving-delivery mode.

Figure 8:
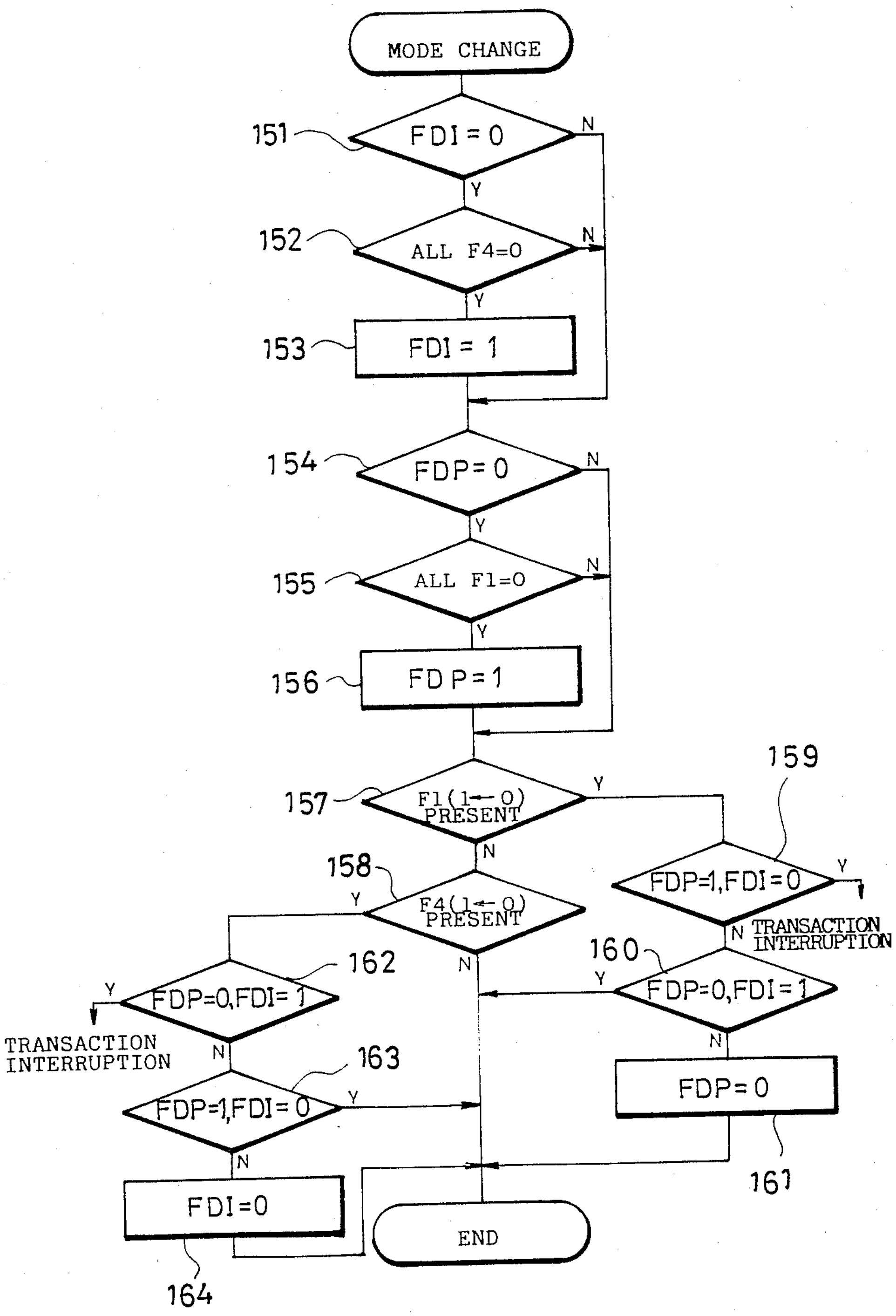
FIG. 8 is a flow chart showing a mode change process.

FIG. 8 shows the mode change process of the present embodiment in detail. It is assumed that the terminal unit is initially in the receiving-delivery mode, with the receiving and delivery mode flags FDP and FDI set to 1. Accordingly NO for step 151, followed by step 154 which also proves NO. The sequence proceeds to step 157 to check the full flags F1A to F1C for a change from 0 to 1 by comparing the current flags F1A to F1C with the previous flags FP1A to FP1C, respectively. If any one of the three full flags is found to have been changed from 0 to 1, the unit is checked as to whether it is in the receiving-only mode (step 159) or in the delivery-only mode (step 160). If it is in neither of these modes (hence in receiving-delivery mode), the receiving mode flag FDP is reset to 0 to change the mode to the delivery-only mode (step 161). Although it is generally infeasible that the condition of one of the containers changed to full despite the delivery-only mode, the process is terminated if step 160 proves YES. If step 159 indicates the receiving-only mode, this means that there is already some reason for being unable to dispense cash, so that the transaction is discontinued.

When no flag is found to have changed to 1 in step 157, the very scanty flags F4A to F4C are checked for the possible change from 0 to 1 in step 158 by comparing the current flags F4A to F4C with the previous flags FP4A to FP4C, respectively. If any one of the three very scanty flags is found to have changed from 0 to 1, the unit is checked as to whether it is in the delivery-only mode (step 162) or in the receiving-only mode (step 163). When it is in neither of these modes (meaning that the unit is in the receiving-delivery mode), the delivery mode flag FDI is reset to 0, setting the unit to the receiving-only mode (step 164). If step 163 indicates the receiving-only mode, the process is terminated. Step 162, if indicating the delivery-only mode, shows that there is already some reason for inhibiting receiving, so that the transaction is discontinued. When both steps 157 and 158 are NO, the process ends without any mode change.

If the unit is in the receiving-only mode, YES for step 151, followed by step 152 to check all the very scanty flags F4A to F4C as to whether they are 0. If all the very scanty flags F4A to F4C are reset to 0 by the increases of cash in all the containers 50A to 50C due to continual deposit transactions, the mode is changed to the receiving-delivery mode by setting the delivery mode flag FDI to 1 (step 153).

If the unit is in the delivery-only mode, YES for step 154, followed by step 155 to check all the full flags F1A to F1C as to whether they are 0. If all the full flags F1A to F1C are reset to 0 by the decreases of cash in all the containers 50A to 50C due to continual delivery of cash for payments, the mode is changed to the receiving-delivery mode by setting the receiving mode flag FDP to 1 (step 156).

The combined container 50D can be used in the following manner although remaining unused in any way in the case of the foregoing embodiment. When cash in one of the containers 50A to 50C has reduced to the very scanty or scanty condition, bills are dispensed from the container 50D and checked, and those of the kind concerned are supplied to that container for replenishment, during the mode change process. When desired, other containers may be similarly replenished with bills. If the amount of cash still remains very scanty despite the replenishment, the mode is changed. Similarly when the amount of cash in one of the classifying containers has reached the full or plenty condition, some of the cash is transferred to the combined container. When the two containers have become full, the mode is changed. This serves to reduce the frequency or duration of the operation in the receiving-only mode or delivery-only mode.

According to the present embodiment, each of the classifying containers is provided with the scanty sensor 53 in addition to the very scanty sensor 54. The very scanty flag F4 is set to 1 when the uppermost bill is brought to a level below the sensor 54 with a decrease in the amount of bills, and the flag F4 is reset to 0 when the uppermost bill reaches a level above the sensor 53 by virtue of the subsequent increase of the amount of bills. Thus the level at which the flag F4 is set to 1 differs from the level at which it is reset to 0. Likewise, the level at which the full flag F1 is set to 1 differs from the level at which it is reset to 0. This prevents the transaction from changing upon every transaction. However, the plenty sensor 52 and the scanty sensor 53 need not always be provided.

The flags F1 and F4 are checked for a change in steps 157 and 158. The mode can be changed also only by checking whether these flags are 1 or 0. Further in place of the previous full flags FP1 and previous very scanty flags FP4, codes (1 bit) representing a change or no change can be stored at the locations where the flags F1 and F4 are stored.

Although bills only are used as cash in the foregoing embodiment, the invention is of course applicable to transaction terminal units for handling coins. Further the present invention is not limited to terminal units to be manipulated by customers but is also useful for cash handling devices installed at the counter for the teller. Although pilot lamps are illustrated as the transaction mode indicators, a CRT or some other display means are alternatively usuable. The cash classifying containers, although fixedly installed in place, can be made removable.

When one of the classifying containers has reached the full condition or the very scanty condition in the foregoing embodiment, the receiving-delivery mode is immediately changed to the delivery-only mode or to the receiving-only mode (step 157 or 158). However, when one or two of the containers are brought into the full or very scanty condition, the following procedure can be followed. The customer may be so led as to insert bills of the kind other than those in the full container, with a limitation imposed on the kind of bill to be used for depositing, or the bills to be dispensed may be replaced by those in the containers which are not in the very scanty condition. Alternatively, the customer may be advised to key-in such a sum of payment as can be dispensed with bills of the kind which is not very scanty. The mode is to be changed when all the classifying containers are full or in the very scanty condition. An embodiment will be described below which is adapted to set such limitations to cash receipt and delivery.

First, limitations to the delivery of cash. In setting the number of bills to be dispensed, the smallest possible number is generally specified. Of the combinations of kinds of money A, B and C for realizing the sum to be paid, the above method refers to the combination in which the total number of bills is smallest or minimum. For example, when the sum to be paid is $10, a $10 bill is dispensed for payment. If it is $8, a $5 bill and three $1 bills are dispensed. If it is $153, fifteen $10 bills and three $1 bills are dispensed. These examples are based on the assumption that the bills A, B and C are $1, $5 and $10 bills.

When the amount of cash in at least one of the classifying containers of the cash handling device 34 in the terminal unit has reduced to the very scanty condition, a limitation to the delivery of cash is set for payment transactions. Such limitations to cash delivery include change of the kind of money, limitation of the kind of money and suspension of payment. A change of the kind of money refers to the procedure of replacing the kind of money in the very scanty condition by another kind of money in setting the number of bills to be paid. This is an exception to the above-mentioned method of specifying a minimum number of bills. The kind of money is changed when only $10 bills or $5 bills, or both $10 bills and $5 bills have been decreased to the very scanty condition. When $1 bills are in the very scanty condition, a limitation is set to the kind of money instead of the change of the kind of money since there is no money of another kind for replacement. When $10 bills alone are very scanty, each $10 bill is replaced by two $5 bills. When only $5 bills are very scanty, each $5 bill is replaced by five $1 bills. If both $10 bills and $5 bills are very scanty, the $10 bill is replaced by ten $1 bills, and the $5 bill by five $1 bills.

The limitation of the kind of money refers to a limitation on the unit of the sum to be paid. When only $1 bills, or both $1 bills and $10 bills are in the very scanty condition, the sum to be paid is so limited as to be keyed in in $5 units. Accordingly sums, such as $8 and $12, are not acceptable. The sums payable are in $5 units, such as $10 and $15. When both $1 bills and $5 bills are in the very scanty condition, the sum to be paid is so limited as to be entered in $10 units.

If $1 bills, $5 bills and $10 bills are all very scanty, the payment service is suspended. The terminal unit then operates in the receiving-only mode. Even when the unit is in the condition of limited cash delivery involving change of the kind of money, limitation to the kind of money or suspension of payment, the unit operates at least for deposit transactions. With bills received as deposits and accommodated in the containers 50A to 50C, the kind of money in the very scanty condition ceases to be scanty, with the result that the limitation to cash delivery is lifted according to the degree of replenishment.

Figure 9:
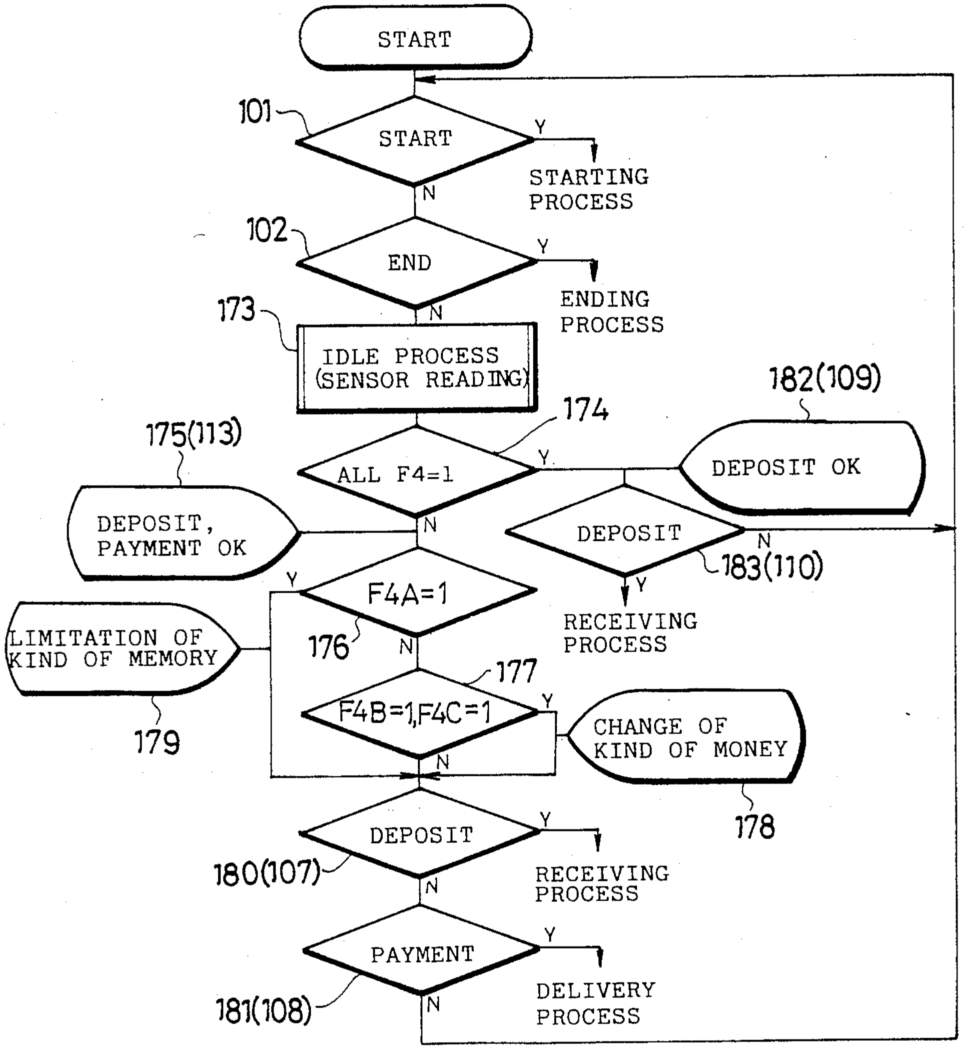
FIG. 9 is a flow chart showing a cash delivery limiting process.

With reference to FIG. 9, the very scanty flags F4A to F4C are checked (step 174) after an idle step 173 including a sensor reading procedure. When all the very scanty flags F4A to F4C are 1, the payment service is suspended as already stated (steps 182, 183). See steps 109, 110 in FIG. 6. When not all the very scanty flags are 1 (that is, at least one flag is 0), both pilot lamps 19*a*, 19*b* go on, showing that the unit is in condition for deposit and payment services (step 175). Subsequently the very scanty flag F4A for $1 bills is checked as to whether it is 1 (step 176). If this flag F4A is 0, the very scanty flags F4B and F4C for $5 bills and $10 bills are checked (step 177). If both the flags are 0, there is no need to limit cash delivery.

If at least one of the very scanty flags F4B and F4C is found to be 1 in step 177, the kind of money is changed, and this is displayed on the CRT 2 (step 178). For example, when the very scanty flag F4C is 1, the CRT 2 shows a message as to the change, such as "AT PRESENT $10 BILLS ARE UNAVAILABLE. TWO $5 BILLS ARE DISPENSED INSTEAD."

If the very scanty flag F4A is 1 in step 176, a limitation is set to the kind of money, and a message to this effect is given on the CRT 2 (step 179). For example, when the flag F4A alone is 1, with 0 for both of the other very scanty flags F4B and F4C, the CRT 2 shows the message, "AT PRESENT $1 BILLS ARE NOT AVAILABLE. PLEASE SPECIFY YOUR SUM IN $10 UNITS OR $5 UNITS." The transaction selected by the customer is thereafter processed (steps 180, 181). The cash delivery limitations of steps 178 and 179 may be displayed after the customer has specified his transaction. When the kind of money is limited, it is desirable to check the sum claimed and keyed-in by the customer for payment as to whether the unit of sum input is within the limits and, if not, to display on the CRT 2 a request to enter a renewed sum for payment.

Figure 10:
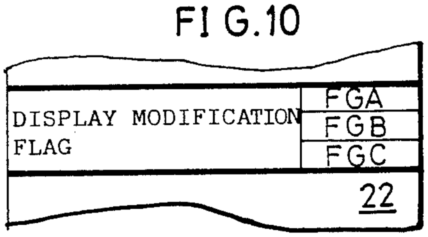
FIG. 10 shows another example of contents of the RAM.

Next, limitations to the receipt of cash will be described. In addition to the data already mentioned, the RAM 22 further contains an area for use as flags FGA to FGC for storing whether it is necessary to modify the display on the CRT 2 for showing a particular limitation to the receipt of cash of each kind as shown in FIG. 10.

When the amount of cash in at least one of the classifying containers of the present embodiment has increased to the full condition, a limitation is set on the receipt of cash. Such limitations to cash receipt include limitation of the kind of money to be received and suspension of depositing service. The limitation of the kind of money refers to a limitation on the kind of money to be inserted into the inlet 4 for deposit transactions. The kind of money in the full condition is rejected. For example, when the container 50A is full, the money of kind A is no longer usable for depositing. The kind of money is limited when one or two of the three kinds of money A, B and C are in the full condition. If all kinds of money are in the full condition, the deposit service is suspended. However, since the system is in continued operation for payment transactions, bills are dispensed from the containers for payment, relieving the containers of the full condition in due time and bringing the system in condition for deposit transactions.

Figure 11:
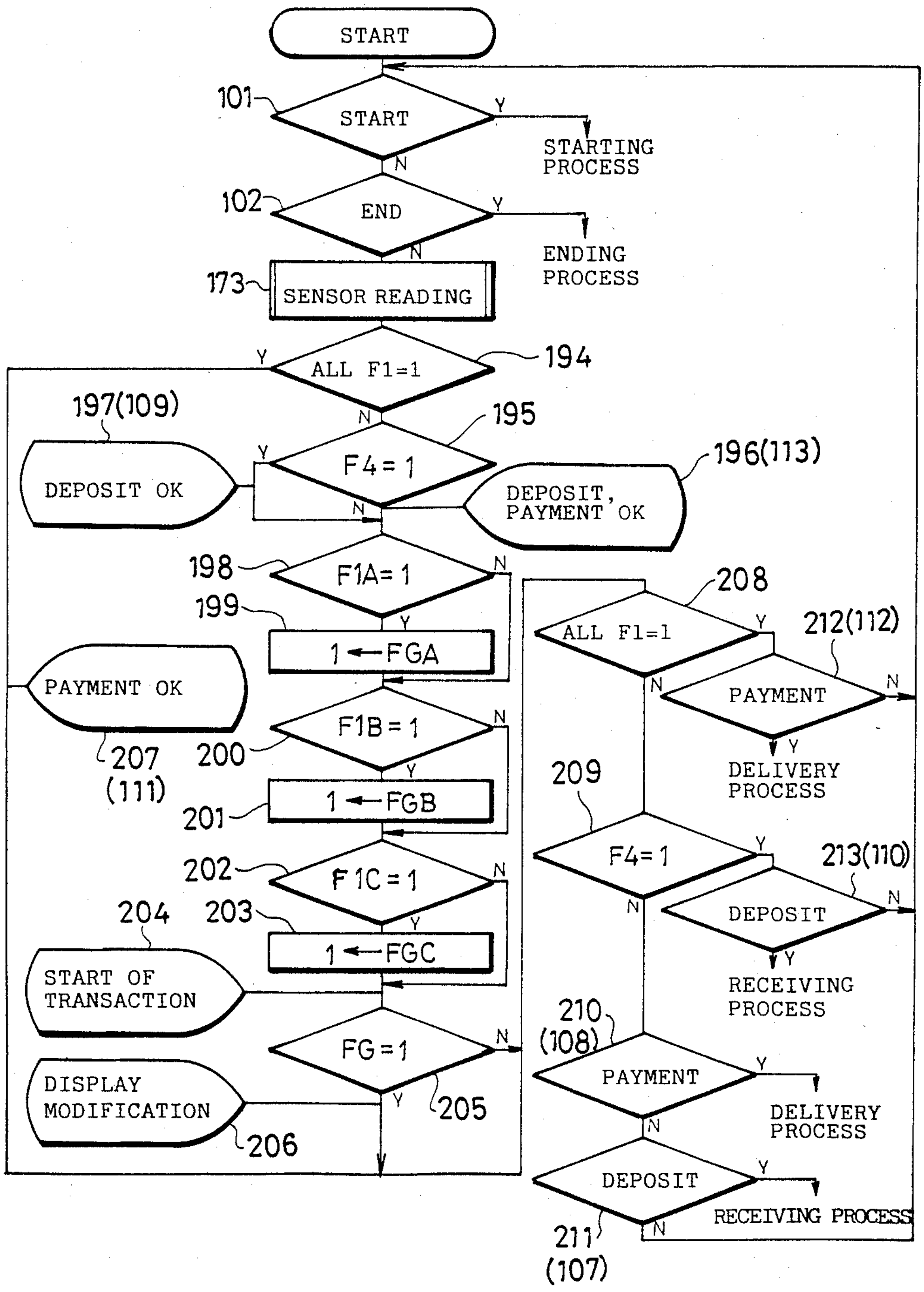
FIG. 11 is a flow chart showing a cash receipt limiting process.

With reference to FIG. 11, the full flags F1A to F1C are checked (step 194) after a sensor reading process (step 173). If any one of these full flags is 0, the very scanty flags F4A to F4C are subsequently checked (step 195). Only when all the very scanty flags are 0, both pilot lamps 19*a*, 19*b* go on, indicating that the system is in condition for deposit and payment transactions (step 196).

The full flags F1A to F1C are further checked in succession (steps 198, 200, 202). If a full flag is found to be 1, the corresponding one of the display modifying flags FGA to FGC is set to 1 (steps 199, 201, 203). For example, if the flag F1B is 1, the flag FGB is set to 1.

Figure 12:
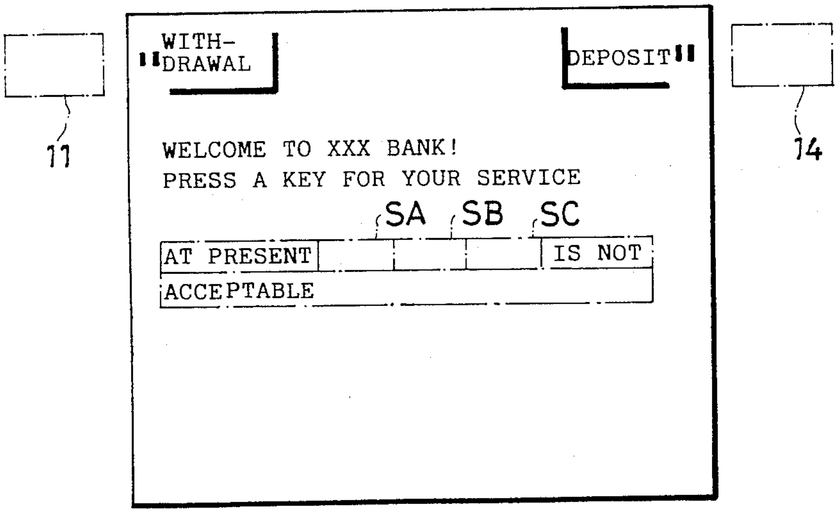
FIG. 12 shows an example of display on a CRT.

Following the above process, instructions as shown in FIG. 12 are displayed on the CRT 2 for starting a transaction (step 204). The display comprises instructions for selecting the desired transaction with a function button and indications of the withdrawal and depositing functions of the buttons 11 and 14. Step 205 checks whether it is necessary to modify the display because at least one of the display modifying flags FG is 1. If at least one of the flags FGA to FGC is set to 1, a modification surrounded by a broken line in FIG. 12 is additionally shown on the CRT 2 (step 206). The modification comprises the sentence of "AT PRESENT . . . IS NOT ACCEPTABLE." and the words of "$1 BILLS", "$5 BILLS" and "$10 BILLS" to be placed in blanks SA to SC in the sentence. The kind of money represented by the modifying flag which is set to 1 is shown in the corresponding one of the blanks SA to SC. For example, if the flag FGB is 1, the term "$5 BILLS" appears in the blank SB. When one or two of the containers 50A to 50C are in the full condition, the limitation set to the kind of money to be received is displayed on the CRT 2. If the full flags are all 0, the modification is not shown on the display.

With reference to the display on the CRT 2, the customer depresses one of the function buttons 11 and 14 to thereby select the desired kind of transaction, whereupon the full flags and the very scanty flags are checked again (steps 208, 209). When not all the full flags F1A to F1C are 1 (that is, when at least one of the flags is 0) and also when the very scanty flags are all 0, the payment or deposit transaction selected is performed (steps 210, 211).

If all the full flags F1A to F1C are found to be 1 in step 194, the deposit service is suspended. The pilot lamp 19*b* only is turned on, indicating that the system is not in condition for depositing but is ready for payment transactions (step 207). Subsequently instructions for selecting the kind of transaction are given on the CRT 2, although unillustrated, followed by step 208.

If step 195 reveals that at least one of the very scanty flags is 1, the pilot lamp 19*a* alone goes on, showing that the system is not in condition for payment transactions but is ready for depositing. The sequence thereafter proceeds to steps 198 to 206 and further to steps 208 and 209.

With the present embodiment, the payment service is suspended if any one of the very scanty flags F4A to F4C is 1, whereas the above process can be readily combined with the cash delivery limiting processes already described.

With reference to FIG. 6, when the terminal unit is in the receiving-only mode (YES for step 104), the customer will specify a deposit service (YES for step 110) for the unit to perform the deposit service. However, if a payment service is selected (NO for step 110), the sequence returns to the start. Thus if the customer should select an impossible transaction without knowing that the unit is in the receiving-only mode, i.e., without reference to the mode indicated by the pilot lamps 19*a*, 19*b*, the customer will be embarrassed at finding the unit performing no action, being unaware of the cause. He might think that the unit has developed a trouble. This would reduce the reliability of the transaction system, or the clerk would be burdened if he is called for every time such an incident occurs. This is also the case with the process shown in FIGS. 9 and 11. Accordingly it is desired that when an impossible transaction is selected whereas the terminal unit is in only one transaction mode for deposits or payments, the customer be informed of the fact that the selected transaction is not available, by a display.

Figure 13:
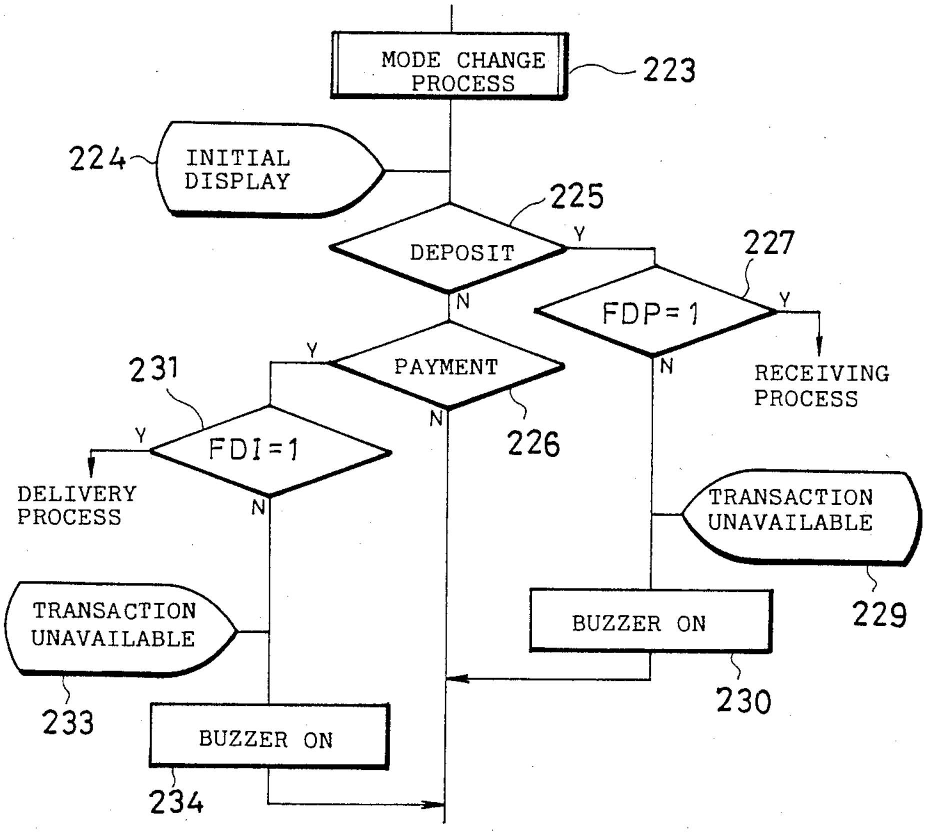
FIG. 13 is a flow chart showing a process for displaying the mode of transaction after a particular kind of transaction has been selected.
Figure 14:
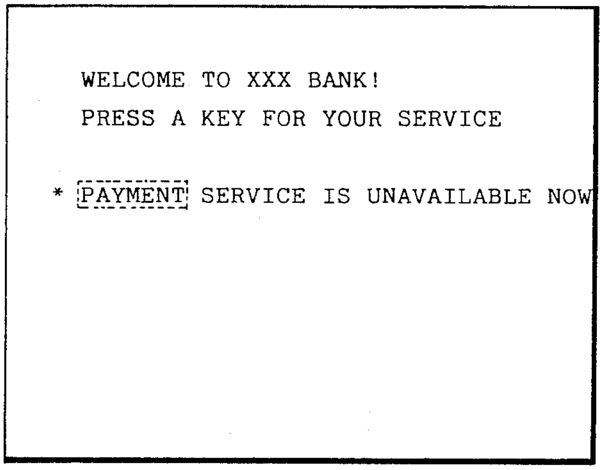
FIG. 14 and FIG. 15 show examples of display on the CRT.

FIG. 13 shows such a procedure. On completion of the mode change process described already (step 223), an initial display is given on the CRT 2 (step 224) for advising the customer to start a transaction. FIG. 14 shows an example of initial display. The initial display is given with reference to the mode flags FDP and FDI in the RAM 22. If the unit is in the receiving-delivery mode, part of the message shown in FIG. 14 is shown. The display reads, "WELCOME TO XXX BANK! PRESS KEY FOR YOUR SERVICE". When the unit is in the receiving-only mode, the display further reads in addition to the two sentences: "PAYMENT SERVICE IS UNAVAILABLE NOW". For the delivery-only mode, the first word of this sentence, i.e., "PAYMENT" is replaced by "DEPOSIT".

Figure 15:
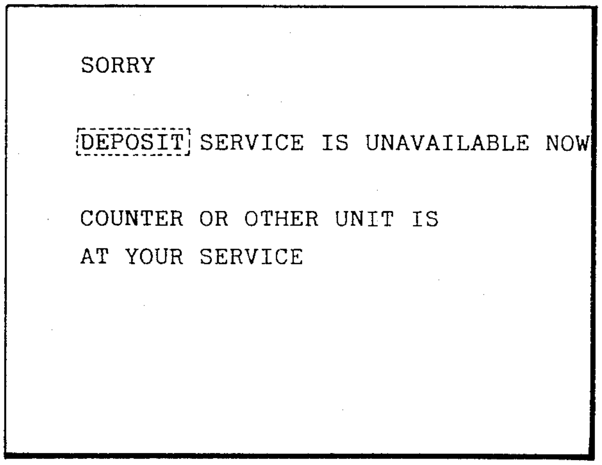

In accordance with the instructions of the initial display on the CRT 2, the customer selects deposit or payment (steps 225, 226), whereupon the sequence proceeds to the specified transaction process. When the deposit transaction is specified, the receiving mode flag FDP is checked as to whether it is 1 or not (step 227). If the flag is 1, the unit is in condition for the deposit transaction, so that the usual receiving process is executed. If the flag FDP is 0, the deposit service is unavailable. A message to this effect is given on the CRT 2 (step 229), and a buzzer (not shown) goes on, for example, for 2 seconds (step 230), telling the customer that the transaction selected is null. FIG. 15 shows an example of display to this effect.

When the payment transaction is specified, the delivery mode flag FDI is checked as to whether it is 1 or not (step 231). If the flag is 1, the unit permits the payment transaction, so that the usual delivery process is executed. If the flag FDI is 0, the payment service is unavailable. A display to this effect is given on the CRT 2 (step 233), and the buzzer goes on (step 234), telling the customer that the transaction selected is null. Step 233 gives the same display as shown in FIG. 15 except that the word "DEPOSIT" which is surrounded by a broken line is replaced by "PAYMENT".

With all the embodiments described above, the transaction mode of the terminal unit 1 is changed suddenly without any warning, possibly causing trouble to the customer. For example, while a customer is in a queue at the terminal unit with the intention of depositing, there is the likelihood that the unit will change to the delivery-only mode immediately before he performs the deposit transaction. The customer is then unable to perform the transaction or has to look for another terminal unit in condition for deposit transactions. Accordingly it is desirable to display a warning against the change of the mode in advance. An embodiment so adapted will be described below.

Figure 16:
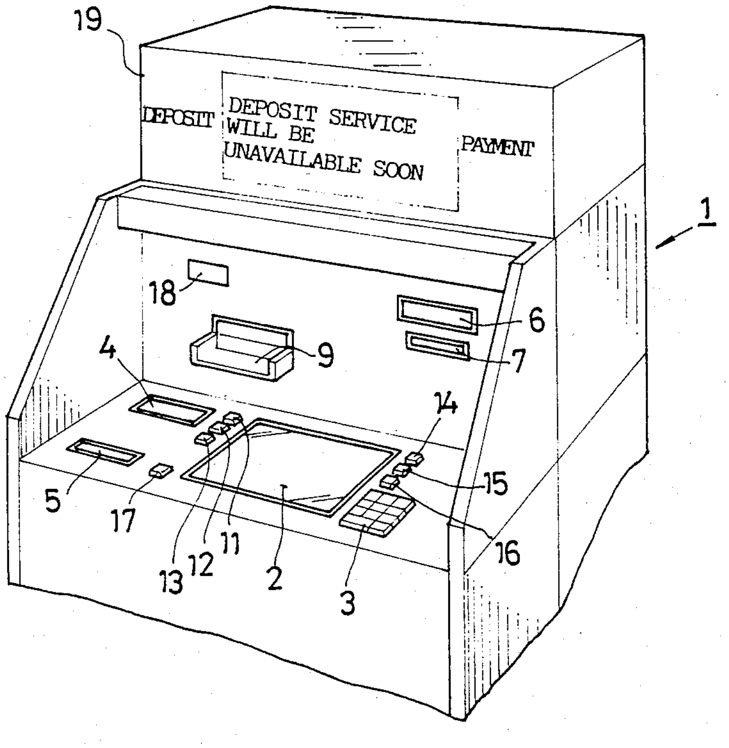
FIG. 16 is a perspective view showing another terminal unit of different appearance.

With reference to FIG. 16, a transaction mode display 19 is disposed above a terminal unit 1 for showing the kinds of services to be offered (transaction modes) and giving warning to a change of mode in advance. The letters "DEPOSIT" are on display for the receiving-only mode, the letters "PAYMENT" for the delivery-only mode, and the letters "DEPOSIT" and "PAYMENT" for the receiving-delivery mode. The mode change warnings include a receiving inhibiting warning (warning 1) which is given before the receiving-delivery mode changes to the delivery-only mode, and a delivery inhibiting warning (warning 2) which is given before the receiving-delivery mode changes to the receiving-only mode. These warning are shown in the center of the display 19. For example, the following messages are used for the warnings 1 and 2.

Warning 1: DEPOSITIING WILL BE UNAVAILABLE SOON.

Warning 2: PAYMENT WILL BE UNAVAILABLE SOON.

The RAM 22 of the terminal unit 1 has, in addition to the flags of FIG. 5, flags representing the previous plenty conditions and scanty conditions.

Figure 17:
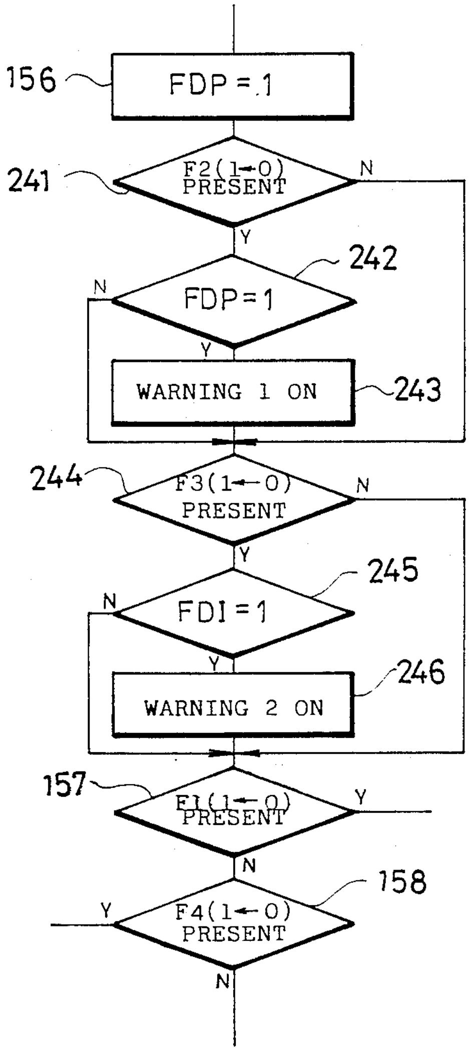
FIG. 17 is a flow chart showing a mode change warning process.

FIG. 17 shows a process for displaying the mode change warnings. Steps 241 to 246 can be interposed, for example, between steps 156 and 157 of FIG. 8. The plenty flags F2A to F2C are checked for a change from 0 to 1 (step 241) by comparing the current plenty flags with the previous plenty flags. If any one of the three plenty flags is found to have changed from 0 to 1, the receiving mode flag FDP is checked as to whether it is 1 (step 242). If it is 1, the unit is in the receiving-delivery mode or the receiving-only mode. In this case only, the message of the warning 1 is shown on the mode display 19.

Next, the scanty flags F3A to F3C are checked for a change from 0 to 1 (step 244). If any one of the three scanty flags is found to have changed from 0 to 1, the delivery mode flag FDI is checked as to whether it is 1 (step 245). When it is 1, the unit is in the receiving-delivery mode or the delivery-only mode. In this case only, the message of the warning 2 is displayed.

The display of the warning 1 is turned off when the mode is changed to the delivery-only mode by step 161 in FIG. 8, and also when all the plenty flags F2A to F2C become 0 due to the change of the plenty flag, which has been 1, to 0 (provided that all the full flags are 0, although the checking procedure therefor is not shown). The display of the warning 2 is turned off when the mode is changed to the receiving-only mode by step 264 in FIG. 8, and also when all the scanty flags F3A to F3C become 0.

To eliminate the possible embarassment of the customer at a change of the transaction mode, the terminal unit may be provided with a human body sensor (such as a photoelectric sensor) for detecting the presence or absence of the customer at the unit so that the transaction mode will be changed only in the absence of the customer.

What is claimed is:

1. A system for performing transactions comprising:
a cash handling device of the circulation type having cash containers for accommodating received cash as classified according to the kind of money and delivering cash from the containers for dispensing,
means for detecting the condition of cash in each of the containers, and
means for controlling the state of transaction according to the condition of cash detected.

2. A system as defined in claim 1 wherein the control of the state of transaction includes change of the mode of transaction, limitation of receipt of cash and limitation of delivery of cash.

3. A system as defined in claim 2 wherein the transaction mode includes a cash receiving-delivery mode, a cash receiving-only mode and a cash delivery-only mode.

4. A system as defined in claim 3 wherein the receiving-delivery mode is changed to the delivery-only mode when the amount of cash in the container has increased to a predetermined level.

5. A system as defined in claim 3 wherein the receiving-delivery mode is changed to the receiving-only mode when the amount of cash in the container has reduced to a predetermined level.

6. A system as defined in claim 1 which has a display for showing the state of transaction.

7. A system for performing transactions comprising:
a cash handling device of the circulation type having cash containers for accommodating received cash as classified according to the kind of money and delivering cash from the containers for dispensing,
first sensor means for detecting that the amount of cash in the container has reduced to a predetermined delivery inhibition level,
second sensor means for detecting that the amount of cash in the container has increased to a predetermined delivery inhibition cancelling level,
third sensor means for detecting that the amount of cash in the container has increased to a predetermined receiving inhibition level,
fourth sensor means for detecting that the amount of cash in the container has reduced to a predetermined receiving inhibition cancelling level, and
means for changing the mode of transaction to a cash receiving-only mode upon the detection by the first sensor means, to a cash delivery-only mode upon the detection by the third sensor means, or to a cash receiving-delivery mode upon detection by the second and fourth sensor means.

8. A system as defined in claim 7 wherein the detecting levels for the first sensor means and for the second sensor means are the same.

9. A system as defined in claim 7 wherein the detecting level for the first sensor means is different from and lower than the detecting level for the second sensor means.

10. A system as defined in claim 7 wherein the detecting levels for the third sensor means and for the fourth sensor means are the same.

11. A system as defined in claim 7 wherein the detecting level for the third sensor means is different from and higher than the detecting level for the fourth sensor means.

12. A system as defined in claim 7 which has a display for showing the transaction mode changed.

13. A system for performing transactions comprising:
a cash handling device of the circulation type having cash containers for accommodating received cash as classified according to the kind of money and delivering cash from the containers for dispensing,
first sensor means for detecting that the amount of cash in the container has reduced to a predetermined level,
second sensor means for detecting that the amount of cash in the container has increased to a predetermined level, and
means for limiting the delivery of cash upon the detection by the first sensor means and for lifting the limitation of the delivery of cash upon the detection by the second sensor means.

14. A system as defined in claim 13 wherein the limitation of the delivery of cash includes change of the kind of money to be dispensed, limitation on the unit of the sum to be paid and suspension of payment.

15. A system as defined in claim 13 which has a display for showing the limits to the delivery of cash.

16. A system as defined in claim 13 wherein the detecting levels for the first sensor means and for the second sensor means are the same.

17. A system as defined in claim 13 wherein the detecting level for the first sensor means is different from and lower than the detecting level for the second sensor means.

18. A system for performing transactions comprising:
a cash handling device of the circulation type having cash containers for accommodating received cash as classified according to the kind of money and delivering cash from the containers for dispensing,
first sensor means for detecting that the amount of cash in the container has increased to a predetermined level,
second sensor means for detecting that the amount of cash in the container has reduced to a predetermined level, and
means for limiting the receipt of cash upon the detection by the first sensor means and for lifting the limitation of the receipt of cash upon the detection by the second sensor means.

19. A system as defined in claim 18 wherein the limitation of the receipt of cash includes change of the kind of money to be received and suspension of deposit.

20. A system as defined in claim 18 which has a display for showing the limits to the receipt of cash.

21. A system as defined in claim 18 wherein the detecting levels for the first sensor means and for the second sensor means are the same.

22. A system as defined in claim 18 wherein the detecting level for the first sensor means is different from and higher than the detecting level for the second sensor means.

* * * * *